United States Patent
Park

(10) Patent No.: US 11,717,997 B2
(45) Date of Patent: Aug. 8, 2023

(54) SCRATCH-PROOF TPU CUTTING BOARD HAVING INCREASED WEAR RESISTANCE AND NO TOXICITY AND METHOD OF MANUFACTURING SAME

(71) Applicant: JINHAN Industry Co., Ltd, Incheon (KR)

(72) Inventor: Hong Kyu Park, Seoul (KR)

(73) Assignee: JINHAN INDUSTRY CO. LTD, Incheon (KR)

( * ) Notice: Subject to any disclaimer, the term of this patent is extended or adjusted under 35 U.S.C. 154(b) by 549 days.

(21) Appl. No.: 16/710,885

(22) Filed: Dec. 11, 2019

(65) Prior Publication Data
US 2021/0154895 A1    May 27, 2021

(30) Foreign Application Priority Data
Nov. 21, 2019    (KR) .................. 10-2019-0150029

(51) Int. Cl.
*B29C 45/00*    (2006.01)
*A47J 47/00*    (2006.01)
(Continued)

(52) U.S. Cl.
CPC ......... *B29C 45/0001* (2013.01); *A47J 47/005* (2013.01); *C08K 3/30* (2013.01);
(Continued)

(58) Field of Classification Search
CPC ...... A47J 47/005; C08L 75/04; C08K 5/0016; C08K 3/30; C08K 5/098;
(Continued)

(56) References Cited

U.S. PATENT DOCUMENTS

| 2006/0148934 A1* | 7/2006 | Miyama ................... C08J 5/00 524/451 |
| 2011/0263764 A1* | 10/2011 | Tishkov ............... C08L 101/00 524/115 |

(Continued)

FOREIGN PATENT DOCUMENTS

KR    101167070    *    7/2012

OTHER PUBLICATIONS

Machine translation of KR 1011607070 (Year: 2012).*

*Primary Examiner* — Doris L Lee
(74) *Attorney, Agent, or Firm* — Park Legal Counsel Group, PLLC

(57) ABSTRACT

Disclosed are a scratch-proof TPU (thermoplastic polyurethane) cutting board having increased wear resistance and no toxicity and a method of manufacturing the same, the method according to a preferred embodiment including (1) weighing 72 wt % of TPU, 25 wt % of magnesium sulfate, and 3 wt % of a dispersant, (2) placing the materials weighed in step (1) in a mixing tank and performing mixing with stirring for 40 min, (3) placing the mixed materials in a dryer and performing drying at 80° C. for 3 hr, and (4) placing the dried materials in an injection-molding machine and performing injection molding, whereby the molecular cohesion of TPU and magnesium sulfate is enhanced, whereby the final TPU cutting board has greatly increased wear resistance and friction resistance and is non-toxic, and surface scratches do not occur due to a cutting process when using the cutting board, thereby preventing discoloration of the surface of the cutting board.

7 Claims, 1 Drawing Sheet

(51) Int. Cl.
*C08K 3/30* (2006.01)
*C08K 5/098* (2006.01)
*B29K 75/00* (2006.01)
*B29L 31/00* (2006.01)

(52) U.S. Cl.
CPC ...... *C08K 5/098* (2013.01); *B29C 2045/0096* (2013.01); *B29K 2075/00* (2013.01); *B29L 2031/74* (2013.01); *C08K 2003/3063* (2013.01)

(58) Field of Classification Search
CPC ........ C08K 2003/3063; B29C 45/0001; B29C 2045/0096; B29K 2075/00; B29L 2031/74
USPC .......................................................... 269/298
See application file for complete search history.

(56) References Cited

U.S. PATENT DOCUMENTS

2017/0035253 A1* 2/2017 Pimentel ............... A47J 47/005
2018/0044500 A1* 2/2018 Idemitsu .................. C08K 7/08

* cited by examiner

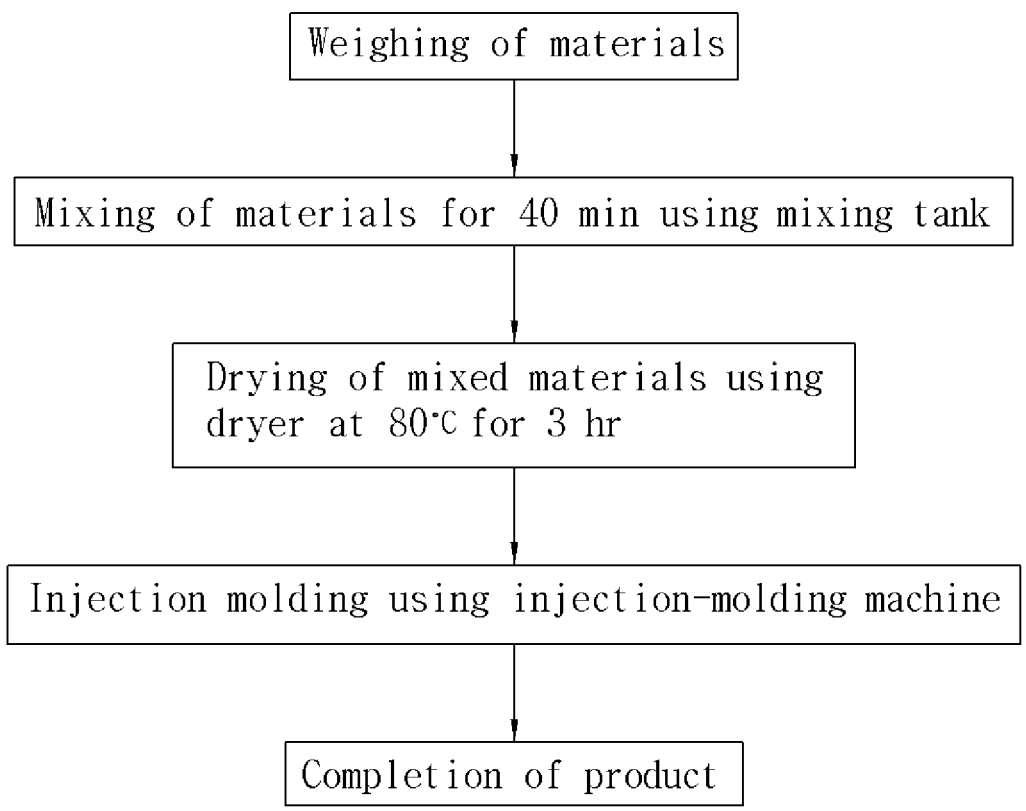

SCRATCH-PROOF TPU CUTTING BOARD HAVING INCREASED WEAR RESISTANCE AND NO TOXICITY AND METHOD OF MANUFACTURING SAME

CROSS REFERENCE TO RELATED APPLICATION

The present application claims priority based on Korean Patent Application No. 10-2019-0150029, filed on Nov. 21, 2019, the entire content of which is incorporated herein for all purposes by this reference.

BACKGROUND OF THE INVENTION

1. Technical Field

The present invention relates to a scratch-proof TPU (thermoplastic polyurethane) cutting board having increased wear resistance and no toxicity and a method of manufacturing the same.

2. Description of the Related Art

In general, a cutting board is used to cut food ingredients when cooking food.

Typically, a cutting board is made of wood, but nowadays, a plastic cutting board composed mainly of synthetic resin is provided by virtue of the development of technology.

A plastic cutting board has the advantage of not absorbing water, but when cutting ingredients for cooking, scratches are created in the surface of the cutting board, and germs may propagate in the scratches, and pigments contained in the food ingredients may penetrate the cuts, undesirably discoloring the surface of the cutting board.

With the goal of solving this problem, the present applicant has provided a scratch-proof cutting board of the prior Korean Patent No. 10-1616277.

However, the conventional scratch-proof cutting board is problematic because polytetrafluoroethylene (TPFE), which is used as the additive, is incapable of completely binding with polyethylene (PE), serving as the main material, and thus the wear resistance of the scratch-proof cutting board that is finally produced is somewhat decreased, so that scratches are formed in the surface of the cutting board upon usage thereof. Moreover, the cutting board that is produced is very expensive due to the high price of polytetrafluoroethylene (TPFE), which is undesirable. Accordingly, there is a need for cutting boards that are not limited as such.

SUMMARY OF THE INVENTION

Accordingly, the present invention has been made keeping in mind the problems encountered in the related art, and an objective of the present invention is to provide a scratch-proof TPU (thermoplastic polyurethane) cutting board having increased wear resistance and no toxicity and a method of manufacturing the same, the method according to at least one embodiment including (1) weighing about 72 wt % of TPU, about 25 wt % of magnesium sulfate, and about 3 wt % of a dispersant, (2) placing the materials weighed in step (1) in a mixing tank and performing mixing with stirring for about 40 min, (3) placing the mixed materials in a dryer and performing drying at about 80° C. for about 3 hr, and (4) placing the dried materials in an injection-molding machine and performing injection molding, whereby molecular cohesion of TPU and magnesium sulfate may be enhanced, and thus the TPU cutting board that is finally produced has greatly increased wear resistance and friction resistance and has no toxicity, and surface scratches do not occur due to a cutting process when using the cutting board, thereby preventing discoloration of the surface of the cutting board.

Although the application is described with preferred compositions, it is understood that a range of the constituent of the compositions can be used and still achieve the desired results with respect to wear resistance, friction, and toxicity. More specifically, TPU may be between about 65 wt % and about 79 wt %, or more preferably between about 68 wt % and about 76 wt %. Magnesium sulfate or other inorganic salts may be present in an amount sufficient to increase wear resistance, such as between about 22 wt % and about 28 wt %, or more preferably between about 22.5 wt % and about 27.5 wt %. The dispersant may comprise the remainder of the composition, or about 1.0 wt % to about 10.5 wt %. The mixing of the constituents of the composition may performed in various ways and for various time, including between about 30 minutes and 50 minutes. The mixed materials may be dried using various protocols, including by placing the mixture in a dryer and performing drying at a temperature from about 70° C. to about 90° C., or more preferably from about 76° C. to about 84° C. for about 2.5 to about 3.5 hrs. The dried mixture is then exposed to pressure, such as via an injection-molding machine, whereby molecular cohesion of the TPU and magnesium sulfate is enhanced, and thus the TPU cutting board that is finally produced has greatly increased wear resistance and friction resistance and no toxicity, and the likelihood of surface scratches is reduced.

According to the present invention, molecular cohesion between TPU, serving as a basic material, and magnesium sulfate, serving as an additive, is enhanced, and thus the resulting TPU cutting board has greatly increased wear resistance and friction resistance and is non-toxic, and surface scratches do not occur due to a cutting process when using the cutting board, whereby the surface of the cutting board can be prevented from being discolored by various pigments contained in the cut food ingredients.

BRIEF DESCRIPTION OF DRAWING

FIG. 1 is a flowchart showing a process of manufacturing a scratch-proof TPU cutting board according to the present invention.

DESCRIPTION OF SPECIFIC EMBODIMENTS

Hereinafter, a detailed description will be given of embodiments of the present invention with reference to FIG. 1.

As shown in FIG. 1, a method of manufacturing a scratch-proof TPU cutting board having increased wear resistance and no toxicity, according to the present invention, may include (1) weighing about 72 wt % of TPU (thermoplastic polyurethane), about 25 wt % of magnesium sulfate, and about 3 wt % of a dispersant, (2) placing the materials weighed in step (1) in a mixing tank and performing mixing with stirring for about 40 min, (3) placing the mixed materials in a dryer and performing drying at about 80° C. for about 3 hr, and (4) placing the dried materials in an injection-molding machine and performing injection molding.

As discussed above, the TPU may be between about 65 wt % and about 79 wt %, or more preferably between about 68 wt % and about 76 wt %. The magnesium sulfate or other inorganic salt(s) may be present in an amount sufficient to increase wear resistance, such as between about 22 wt % and about 28 wt %, or more preferably between about 22.5 wt % and about 27.5 wt %. The dispersant may comprise the remainder of the composition, or about 1.0 wt % to about 10.5 wt %.

The mixing of the constituents of the composition may performed in various ways and for various time, including between about 30 minutes and 50 minutes. The mixed materials may be dried using various protocols, including by placing the mixture in a dryer and performing drying at a temperature from about 70° C. to about 90° C., or more preferably from about 76° C. to about 84° C. for about 2.5 to about 3.5 hrs. The dried mixture, e.g., at the given temperature, is then exposed to pressure, such as via an injection-molding machine, whereby molecular cohesion of the TPU and magnesium sulfate is enhanced, and thus the TPU cutting board or other article of manufacture is finally produced.

Here, the dispersant may include zinc stearate and stearic acid, which are mixed at a ratio of 1:1.

In the present invention, the scratch-proof cutting board contains, as a main component, TPU. Here, TPU is molded and used in the form of pellets or granules.

As an additive, magnesium sulfate is used. It is preferred that magnesium sulfate be used in the form of pellets or granules by cutting magnesium sulfate to a predetermined size by passing the same through an extruder.

The magnesium sulfate may be provided in a powder form, and has excellent friction resistance and wear resistance, high strength, an appropriate melting point, and a very low price.

When the mixture of TPU as the main material and magnesium sulfate as the additive is subjected to injection molding using an injection-molding machine, if the melting points of the main material and the additive do not match, various kinds of incompatible defects such as silver streaks and the like may be formed on the surface of the injection-molded product, which makes it impossible to produce a normal cutting board. Accordingly, magnesium sulfate, which is in a powder form, is cut to a predetermined size by being passed through an extruder, and is thus used in the form of pellets or granules, and the main material, TPU, is also used in the form of pellets or granules.

Briefly, the TPU cutting board having a uniform surface may be produced when both the main material TPU and the magnesium sulfate additive take a predetermined form, such as pellets.

Meanwhile, in the present invention, 3 wt % of the dispersant is preferably used, and the dispersant preferably includes zinc stearate and stearic acid, which are mixed at a ratio of 1:1.

The reason for using the dispersant is to uniformly disperse the additive when TPU, the main material, and magnesium sulfate, the additive for increasing friction resistance and wear resistance, are mixed, whereby the surface strength of the TPU cutting board that is finally produced may be expected to be evenly enhanced.

If the additive is not uniformly dispersed, some portions of the surface of the TPU cutting board that is finally produced may be strengthened by the additive to thus prevent scratching, whereas other portions thereof may not be strengthened by the additive, making it impossible to prevent scratching.

In the present invention, the additive and the dispersant are added to a material having a polymeric structure such as the main material TPU to thus prevent release thereof.

Moreover, since the cutting board is a kitchen utensil, it must be an environmental product that is harmless to human bodies, and hence, non-toxic materials are used as the additive and the dispersant.

The method of manufacturing the TPU cutting board according to a preferred embodiment of the present invention is described below.

Step (1)

In step (1), materials for manufacturing a TPU cutting board are weighed.

72 wt % of TPU (thermoplastic polyurethane), 25 wt % of magnesium sulfate, and 3 wt % of a dispersant are weighed. Here, the dispersant is composed of zinc stearate and stearic acid, which are mixed at a ratio of 1:1.

The main material TPU is provided in a pellet form, and magnesium sulfate is passed through an extruder and cut in the form of pellets so that it may be provided in the same form as TPU.

Step (2)

In step (2), the weighed materials are mixed.

The materials weighed in step (1) are placed in a mixer and stirred for 40 min, whereby all of the main material, the additive, and the dispersant may be uniformly dispersed and mixed.

Step (3)

In step (3), the mixed materials are dried.

Since the main material TPU and the magnesium sulfate additive have high water absorption ability, when the main material and the additive are not completely dried, a normal cutting board may not be formed during injection molding.

Therefore, the mixed materials are placed in a dryer and then dried for about 3 hr at 80° C. so that the main material and the additive contain no water.

Step (4)

After completion of the drying process, the dried materials are placed in an injection-molding machine and subjected to injection molding, thereby producing a TPU cutting board.

The scratch-proof TPU cutting board that is finally produced may be provided in the form of a thin panel, and is bendable, and the surface of the cutting board is strengthened by the additive to thus maximize friction resistance and wear resistance, thereby preventing the cutting board from being scratched by a knife when cutting food ingredients.

Moreover, the TPU cutting board is harmless to human bodies, and has no toxicity.

What is claimed is:

1. A method of manufacturing a TPU (thermoplastic polyurethane) article having increased wear resistance and no toxicity, the method comprising:
   (1) weighing 65-79 wt % of TPU, 22-28 wt % of magnesium sulfate, and a dispersant;
   (2) mixing materials weighed in step (1) in a mixing tank;
   (3) placing the mixed materials in a dryer and performing drying for a desired amount of time at a drying temperature of about 70° C. to about 90° C.; and
   (4) placing the dried materials at the drying temperature in an injection-molding machine and performing injection molding under pressure for sufficient time for the TPU to molecularly cohere to the magnesium sulfate.

2. The method of claim 1, wherein the dispersant comprises zinc stearate and stearic acid, which are mixed at a ratio of 1:1.

3. The method of claim 1, wherein the dispersant comprises about 1.0 wt % to about 10.5 wt % of the mixed materials.

4. The method of claim 1, wherein mixing comprises stirring the material mixture for 30 to 50 minutes.

5. The method of claim 1, wherein drying the mixture comprises exposing the mixture to a temperature from 70° C. to 90° C. for between 2.5 hrs. to 3.5 hrs.

6. A scratch-proof TPU cutting board having increased wear resistance and no toxicity, manufactured by the method of claim 1.

7. A method of manufacturing a TPU (thermoplastic polyurethane) cutting board having increased wear resistance and no toxicity, the method comprising:
   (1) weighing a set of materials consisting of 65-79 wt % of TPU, 22-28 wt % of magnesium sulfate, and 1.0-10.5 wt % of a dispersant;
   (2) mixing the set of materials in a mixing tank;
   (3) placing the mixed materials in a dryer and performing drying for a desired amount of time at a drying temperature of about 70° C. to about 90° C. for between 2.5 hrs. to 3.5 hrs.; and
   (4) placing the dried materials at the drying temperature in an injection-molding machine and performing injection molding under pressure for sufficient time for the TPU to molecularly cohere to the magnesium sulfate, thereby producing the TPU cutting board.

* * * * *